(12) United States Patent
Chapman et al.

(10) Patent No.: US 11,641,280 B1
(45) Date of Patent: May 2, 2023

(54) COMPUTING TECHNOLOGIES FOR ENABLING BLOCKCHAIN-BASED DIGITAL TOKENS WITH ASSET-SPECIFIC ATTRIBUTES

(71) Applicant: Northern Trust Corporation, Chicago, IL (US)

(72) Inventors: Justin Chapman, Chicago, IL (US); Zabrina Smith, Chicago, IL (US); Arijit Das, Chicago, IL (US)

(73) Assignee: Northern Trust Corporation, Chicago, IL (US)

( * ) Notice: Subject to any disclaimer, the term of this patent is extended or adjusted under 35 U.S.C. 154(b) by 0 days.

(21) Appl. No.: 17/845,158

(22) Filed: Jun. 21, 2022

(51) Int. Cl.
*H04L 9/32* (2006.01)
(52) U.S. Cl.
CPC .................. *H04L 9/3234* (2013.01)
(58) Field of Classification Search
None
See application file for complete search history.

(56) References Cited

U.S. PATENT DOCUMENTS

| | | | |
|---|---|---|---|
| 10,706,168 B2 | 7/2020 | Roever et al. | |
| 10,726,002 B1* | 7/2020 | Srivastava | G06F 16/27 |
| 11,095,455 B2 | 8/2021 | Engan et al. | |
| 11,334,883 B1* | 5/2022 | Auerbach | G06Q 20/223 |
| 2019/0303579 A1* | 10/2019 | Reddy | H04L 9/50 |
| 2019/0303623 A1* | 10/2019 | Reddy | G06F 8/71 |
| 2020/0274712 A1* | 8/2020 | Gray | H04L 9/3213 |
| 2020/0327137 A1* | 10/2020 | Farver | G06Q 20/1235 |
| 2021/0264520 A1* | 8/2021 | Cummings | G06Q 20/02 |
| 2021/0374849 A1* | 12/2021 | Cononico | H04L 63/126 |
| 2022/0385642 A1* | 12/2022 | Kravitz | H04L 9/3234 |

FOREIGN PATENT DOCUMENTS

| | | | |
|---|---|---|---|
| CN | 108694041 A | | 10/2018 |
| CN | 109447599 A | | 3/2019 |
| CN | 113221192 A | | 8/2021 |
| CN | 113378217 A | | 9/2021 |
| CN | 113381992 A | * | 9/2021 |
| WO | WO2020010203 A1 | | 1/2020 |
| WO | WO2021079023 A1 | | 4/2021 |
| WO | WO-2021250045 A1 | * | 12/2021 |

* cited by examiner

*Primary Examiner* — Arezoo Sherkat
(74) *Attorney, Agent, or Firm* — Dentons US LLP

(57) ABSTRACT

This disclosure enables a digital token with a set of asset-specific attributes, where the set of asset-specific attributes is modifiable or enabled to receive a new asset-specific attribute at least after the digital token with the set of asset-specific attributes is issued on a blockchain-based tokenization platform. Such functionality may be enabled via the digital token containing an attribute component with a set of key-value pairs populated with a subset of the set of asset-specific attributes, where the set of key-value pairs is programmed to be modified or have a new key-value pair being added thereto after the digital token is issued on the blockchain-based tokenization platform.

24 Claims, 8 Drawing Sheets

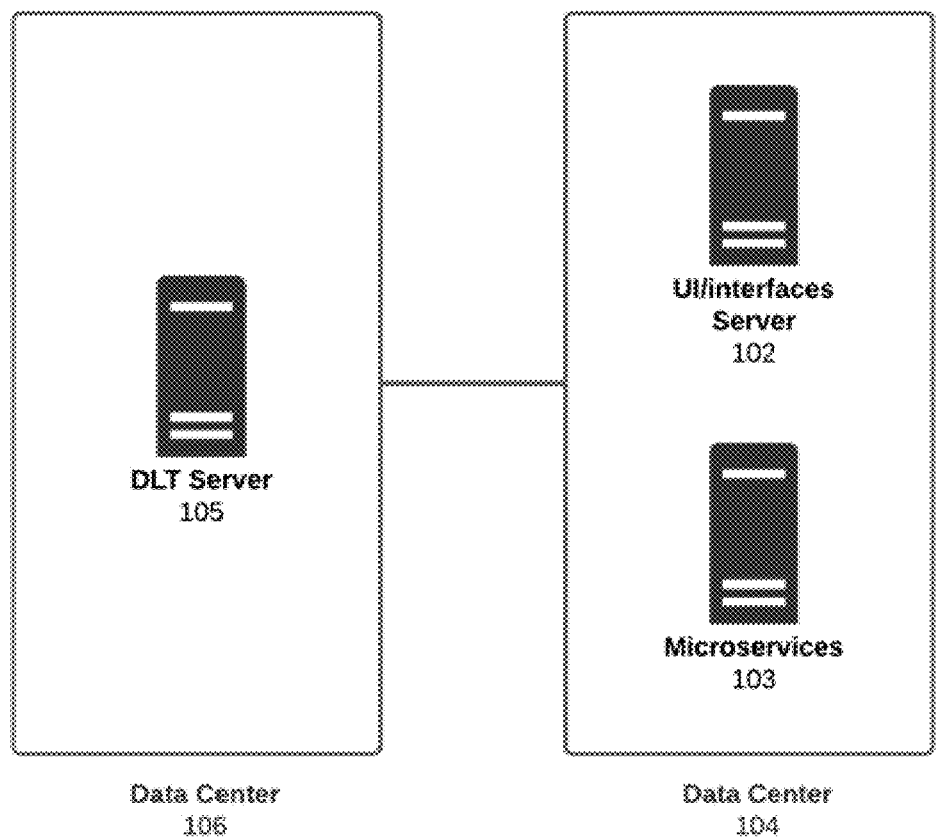
FIG. 1: Physical Conceptual Architecture 100

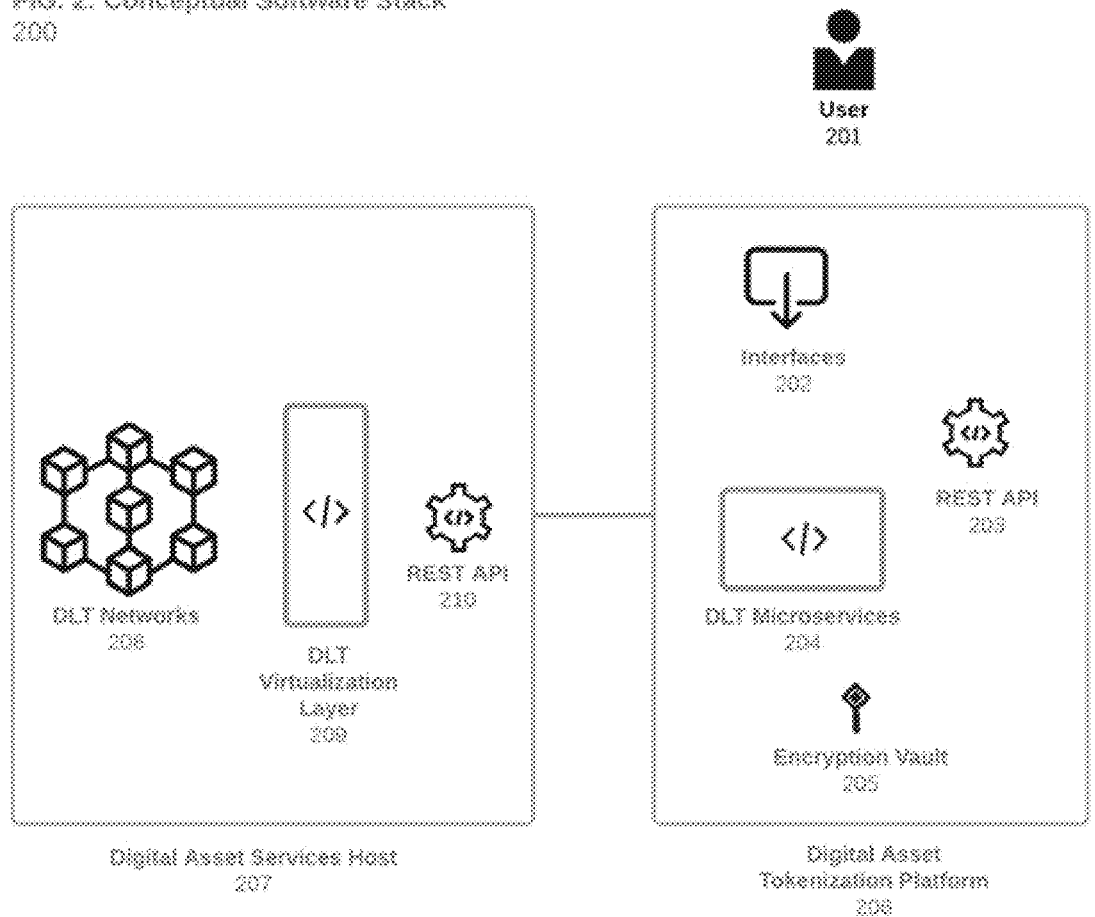

FIG. 3: NT Token Structure
300

Header
301

Attributes
302

Dynamic Attributes Structure
　　303

JSON Key-Value Pairs
　　　　304

Immutable
305

FIG. 4: NT Token Functions
400

Update
401

Set Attribute
402

Set Immutable
403

Transfer (ERC20)
404

Name (ERC20)
405

Symbol (ERC20)
406

TotalSupply (ERC20)
407

BalanceOf (ERC20)
408 directTransferRestriction (ERC1404)
409 messageForTransferRestriction (ERC1404)
410

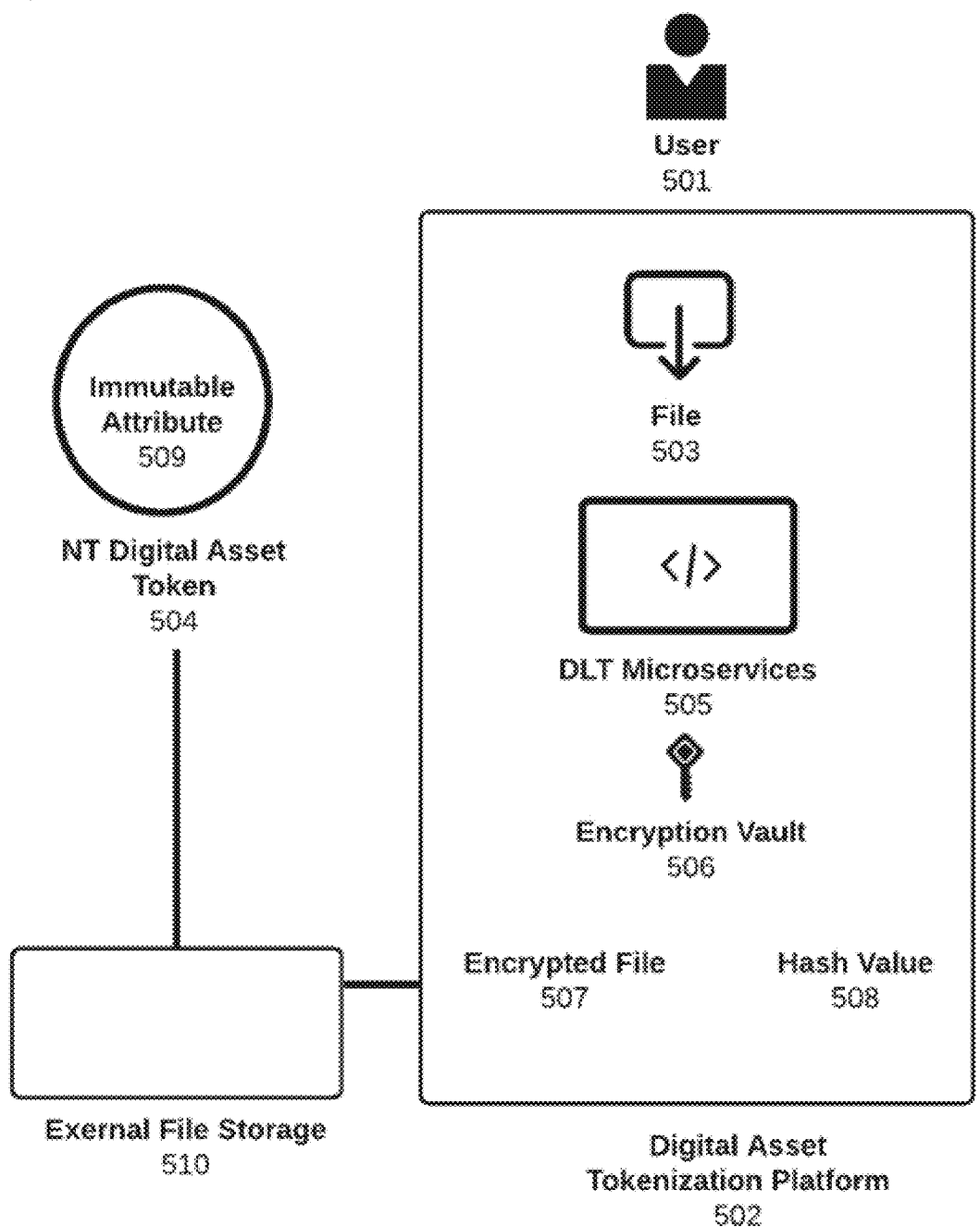
FIG. 5: Token Documentation and Repository

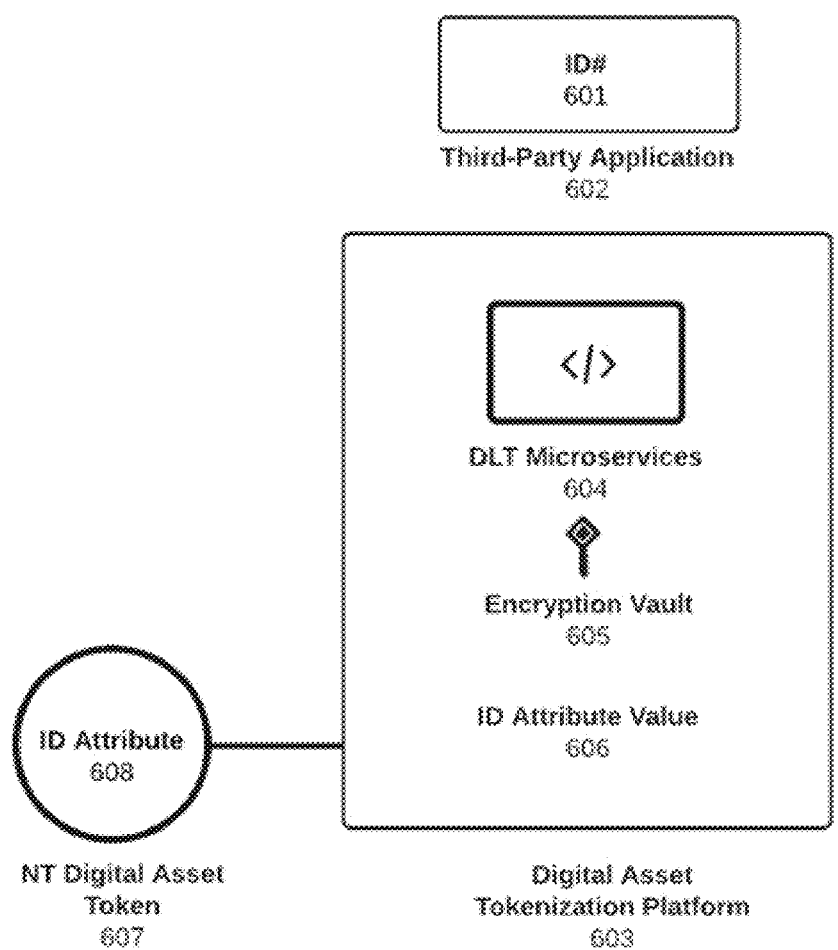
FIG. 6: Token Third Party Systems 600

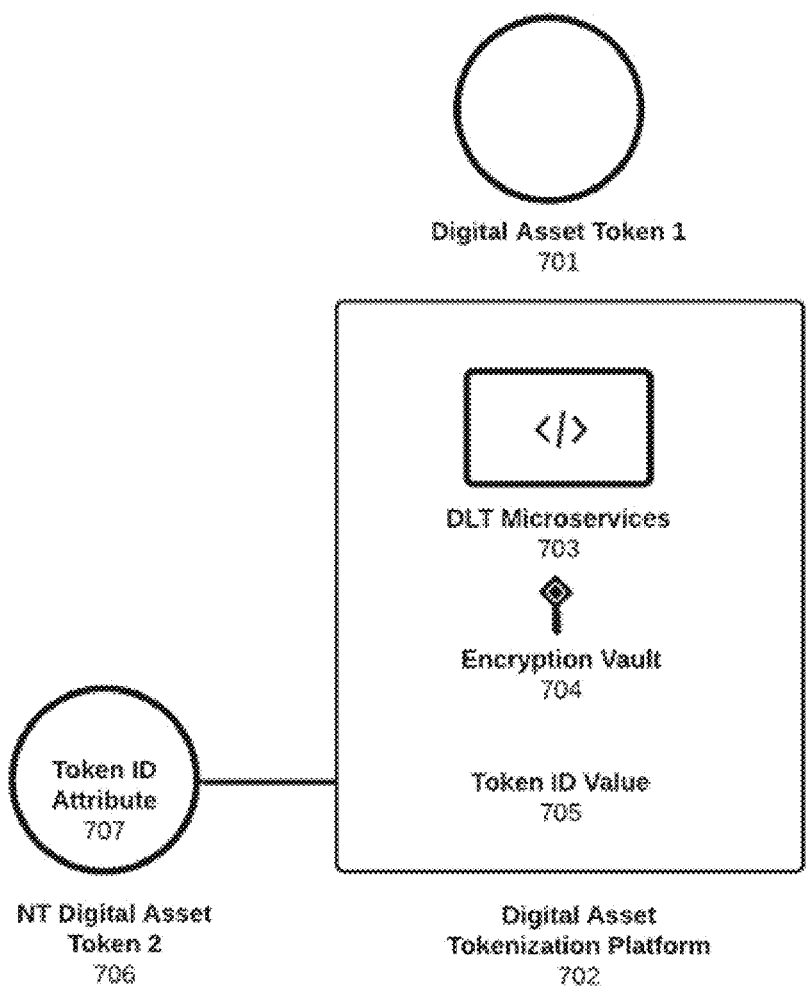
FIG. 7: Token Relationship Linkages

COMPUTING TECHNOLOGIES FOR ENABLING BLOCKCHAIN-BASED DIGITAL TOKENS WITH ASSET-SPECIFIC ATTRIBUTES

TECHNICAL FIELD

Generally, this disclosure relates to blockchains. More specifically, this disclosure relates to blockchain-based digital tokens with asset-specific attributes.

BACKGROUND

An asset (e.g., a bond) can be tokenized via a digital token issued through a smart contract, as instructed by a decentralized app (dApp) on a blockchain-based tokenization platform (e.g., Ethereum). Conventionally, the dApp presents a menu for a user to create the digital token by selecting a standard for the digital token (e.g., ERC20, ERC1400) and inputting a set of asset-specific attributes (e.g., what interest rate is applicable to a bond) to be encoded into the digital token according to the standard. Then, the user further operates the menu to request the dApp to interface with the smart contract to issue the digital token with the set of asset-specific attributes on the blockchain-based tokenization platform based on the standard, where the set of asset-specific attributes is encoded into the digital token according to the standard. Alternatively, instead of the user operating the menu, the dApp can be algorithmically triggered to interface with the smart contract to issue the digital token with the set of asset-specific attributes on the blockchain-based tokenization platform based on the standard, where the set of asset-specific attributes is encoded into the digital token according to the standard.

This state of being enables various technological problems. First, since the set of asset-specific attributes is defined before the digital token is issued on the blockchain-based tokenization platform utilizing the standard, the user is unable to modify the set of asset-specific attributes encoded into the digital token because the standard is programmed to prohibit or not enable such functionality. Second, since the set of asset-specific attributes is defined before the digital token is issued on the blockchain-based tokenization platform utilizing the standard, the user is unable to add new asset-specific attributes for encoding into the digital token because the standard is programmed to prohibit or not enable such functionality. Third, since the standard may change after the digital token with the set of asset-specific attributes is issued on the blockchain-based tokenization platform based on the standard, the user may not be able to keep up (e.g., maintain) with such potential changes, if the user desires for the digital token with the set of asset-specific attributes to remain compliant with the standard, as changed. Fourth, since there may be a new standard developed/introduced after the digital token with the set of asset-specific attributes is issued on the blockchain-based tokenization platform based on the standard, the user may want to adapt the digital token with the set of asset-specific attributes, as issued on the blockchain-based tokenization platform based on the standard, to the new standard.

SUMMARY

This disclosure solves the technological problems noted above by having the digital token with the set of asset-specific attributes, where the set of asset-specific attributes is modifiable or enabled to receive a new asset-specific attribute at least after the digital token with the set of asset-specific attributes is issued on the blockchain-based tokenization platform based on the standard. Such functionality may be enabled via the digital token containing an attribute component with a set of key-value pairs populated with a subset of the set of asset-specific attributes, where the set of key-value pairs is programmed to be modified or have a new key-value pair being added thereto after the digital token is issued on the blockchain-based tokenization platform based on the standard.

In an embodiment, a method may comprise: presenting, by a server, a user interface to a client, wherein the user interface is programmed to receive (a) a set of asset-specific attributes for a digital token to tokenize an asset of an asset type and (b) an identifier of a blockchain-based tokenization platform from a set of identifiers of a set of blockchain-based tokenization platforms capable of hosting the digital token having the set of asset-specific attributes; receiving, by the server, the set of asset-specific attributes and the identifier of the blockchain-based tokenization platform from the client; generating, by the server, the digital token based on the set of asset-specific attributes and the identifier of the blockchain-based tokenization platform such that the digital token contains a header component, an attribute component, and an immutable component, wherein the header component contains an identifier for the asset and a version for the asset, wherein the attribute component contains a first set of attributes for the asset type including a first set of key-value pairs populated with a first subset of the set of asset-specific attributes, wherein the first set of key-value pairs is programmed to be modified or have a new key-value pair being added thereto after the digital token is issued on the blockchain-based tokenization platform based on the identifier of the blockchain-based tokenization platform, wherein the immutable component contains a second set of attributes for the asset type including a second set of key-value pairs populated with a second subset of the set of asset-specific attributes, wherein the second set of key-value pairs is programmed to not be modifiable or removable after the digital token is issued on the blockchain-based tokenization platform based on the identifier of the blockchain-based tokenization platform; issuing, by the server, the digital token on the blockchain-based tokenization platform based on the identifier of the blockchain-based tokenization platform; presenting, by the server, the user interface to the client after the digital token is issued on the blockchain-based tokenization platform based on the identifier of the blockchain-based tokenization platform, wherein the user interface is programmed to receive a user input from the client, wherein the user input includes the identifier for the asset, the version of the asset, and a content; taking, by the server, an action with respect to the digital token after the user input is received based on identifying the digital token via the identifier for the asset and the version of the asset, wherein the action includes modifying the first set of key-value pairs based on the content or adding the new key-value pair to the first set of key-value pairs based on the content; and reissuing, by the server, the digital token on the blockchain-based tokenization platform based on the identifier of the blockchain-based tokenization platform after the action is taken with respect to the digital token.

In an embodiment, a system may comprise: a server programmed to: present a user interface to a client, wherein the user interface is programmed to receive (a) a set of asset-specific attributes for a digital token to tokenize an asset of an asset type and (b) an identifier of a blockchain-based tokenization platform from a set of identifiers of a set of blockchain-based tokenization platforms capable of hosting the digital token having the set of asset-specific attributes; receive the set of asset-specific attributes and the identifier of the blockchain-based tokenization platform from the client; generate the digital token based on the set of asset-specific attributes and the identifier of the blockchain-based tokenization platform such that the digital token contains a header component, an attribute component, and an immutable component, wherein the header component contains an identifier for the asset and a version for the asset, wherein the attribute component contains a first set of attributes for the asset type including a first set of key-value pairs populated with a first subset of the set of asset-specific attributes, wherein the first set of key-value pairs is programmed to be modified or have a new key-value pair being added thereto after the digital token is issued on the blockchain-based tokenization platform based on the identifier of the blockchain-based tokenization platform, wherein the immutable component contains a second set of attributes for the asset type including a second set of key-value pairs populated with a second subset of the set of asset-specific attributes, wherein the second set of key-value pairs is programmed to not be modifiable or removable after the digital token is issued on the blockchain-based tokenization platform based on the identifier of the blockchain-based tokenization platform; issue the digital token on the blockchain-based tokenization platform based on the identifier of the blockchain-based tokenization platform; present the user interface to the client after the digital token is issued on the blockchain-based tokenization platform based on the identifier of the blockchain-based tokenization platform, wherein the user interface is programmed to receive a user input from the client, wherein the user input includes the identifier for the asset, the version of the asset, and a content; take an action with respect to the digital token after the user input is received based on identifying the digital token via the identifier for the asset and the version of the asset, wherein the action includes modifying the first set of key-value pairs based on the content or adding the new key-value pair to the first set of key-value pairs based on the content; and reissue the digital token on the blockchain-based tokenization platform based on the identifier of the blockchain-based tokenization platform after the action is taken with respect to the digital token.

DESCRIPTION OF DRAWINGS

FIG. 1 shows an embodiment of a computing architecture for enabling the digital token to have the set of asset-specific attributes that may be modified or added thereto at least after the digital token is issued.

FIG. 2 shows an embodiment of a software stack for enabling the digital token to have the set of asset-specific attributes that may be modified or added thereto at least after the digital token is issued.

FIG. 3 shows an embodiment of the digital token enabled to have the set of asset-specific attributes that may be modified or added thereto at least after the digital token is issued.

FIG. 4 shows an embodiment of a set of functions of the digital token enabled to have the set of asset-specific attributes that may be modified or added thereto at least after the digital token is issued.

FIG. 5 shows an embodiment of a computing architecture for enabling the digital token to have the set of asset-specific attributes that may be modified or added thereto at least after the digital token is issued while the digital token is enabled to reference or contain a document with a human-readable text specific to the digital token.

FIG. 6 shows an embodiment of a computing architecture for enabling the digital token to have the set of asset-specific attributes that may be modified or added thereto before or after the digital token is issued while the digital token is enabled to link to information in a third-party computing system.

FIG. 7 shows an embodiment of a computing architecture for enabling the digital token to have the set of asset-specific attributes that may be modified or added thereto at least after the digital token is issued while the digital token is enabled to linked to another digital token in a serial manner or through an inheritance manner.

DETAILED DESCRIPTION

Figure 8:
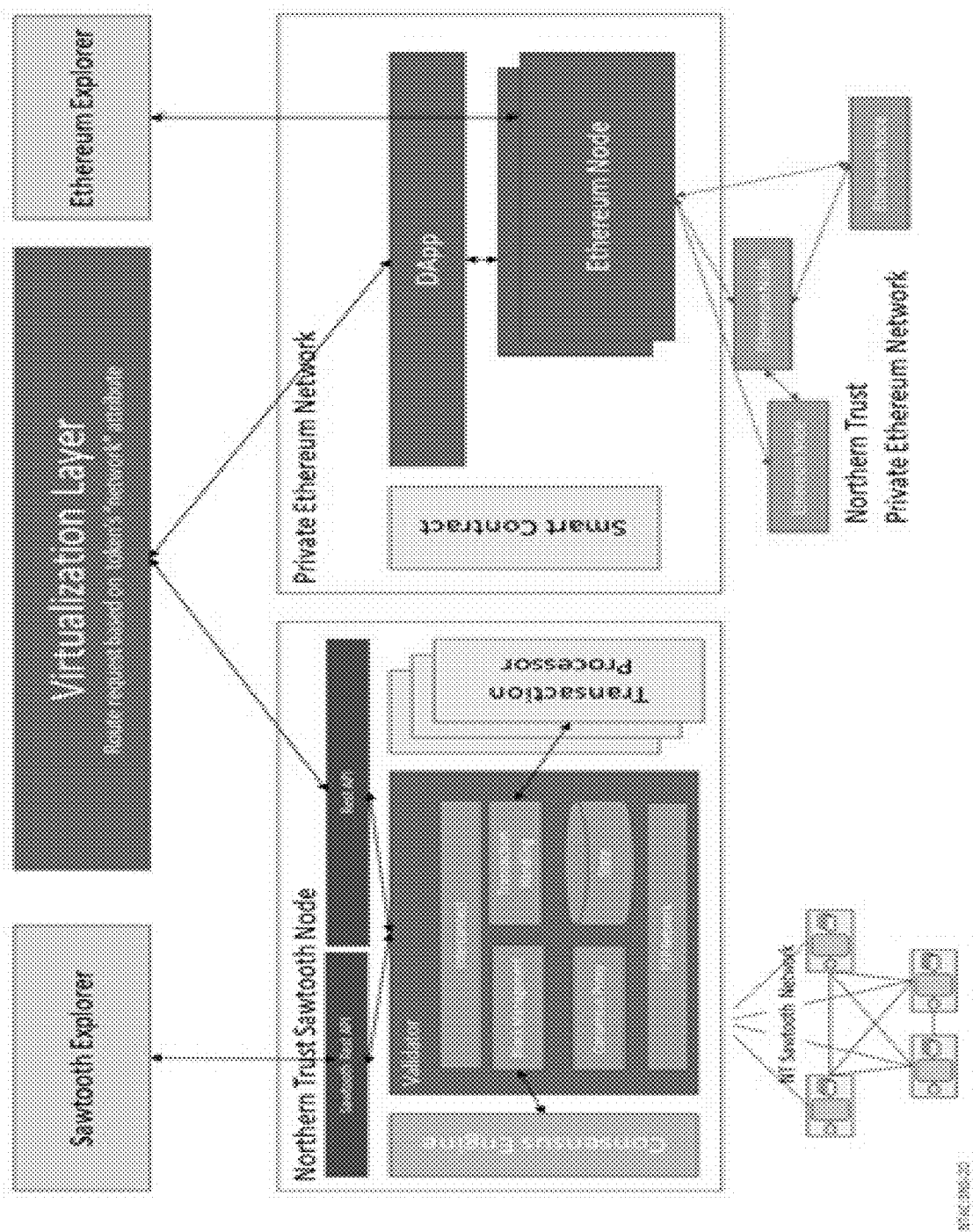
FIG. 8 shows an embodiment of a computing architecture for enabling a user to select the blockchain-based tokenization platform on which to issue or reissue the digital token.

This disclosure enables the digital token with the set of asset-specific attributes, where the set of asset-specific attributes is modifiable or enabled to receive the new asset-specific attribute at least after the digital token with the set of asset-specific attributes is issued on the blockchain-based tokenization platform based on the standard. Such functionality may be enabled via the digital token containing the attribute component with the set of key-value pairs populated with the subset of the set of asset-specific attributes, where the set of key-value pairs is programmed to be modified or have the new key-value pair being added thereto after the digital token is issued on the blockchain-based tokenization platform based on the standard. As such, the user is able to modify the set of asset-specific attributes encoded into the digital token or add new asset-specific attributes for encoding into the digital token. Likewise, if the standard changes after the digital token with the set of asset-specific attributes is issued the blockchain-based tokenization platform based on the standard, then the user may be able to keep up (e.g., maintain) with such changes when the user desires for the digital token with the set of asset-specific attributes to remain compliant with the standard, as changed. Similarly, if the new standard is developed/introduced after the digital token with the set of asset-specific attributes is issued the blockchain-based tokenization platform based on the standard, then the user may adapt the digital token with the set of asset-specific attributes, as issued on the blockchain-based tokenization platform based on the standard, to the new standard. Note that the digital token may be virtually representative of traditional electronic assets (e.g., equities, fixed income) that are created entirely in an electronic dematerialized form within a central database that records legal asset ownership and transactions, traditional physical assets (e.g. real estate, commodities, diamonds, cars, art, gold) that are created in a physical material form and held securely by a trusted custodian entity that records assets held for custodian clients in a proprietary database of asset ownership and transactions, or new digital assets (e.g. investments, crypto-currencies, fiat-currencies) that are created in a digital form directly on a distributed technology platform that records ownership and transactions.

For example, this technology may enable the asset-specific attributes of the digital token to be defined upon or after issuance thereof, while enabling some asset lifecycle processes to be embedded into the digital token. This technology may support currently used DLT protocols and digital token standards, but, in some cases, is not dependent on any current or future standard. The digital token may be asset-agnostic and designed with a dynamic and flexible structure that allows the digital token to represent a large variety of asset classes, financial instruments, or fixed assets, which may include real estate, collectibles, precious metals, carbon, non-fungible tokens, or other forms of property. The digital token's compatibility with current smart contracts that run on current DLTs enable automation of operations at or after digital token issuance, where such automation is not possible with traditional digital token-management technology. Resultantly, this technology bridges a gap between traditional blockchain-based tokenization platforms and the newer generation of blockchain-based tokenization platform. The blockchain-based tokenization platform adds functions to current standards that enable provision of greater security, faster and more efficient issuance or reissuance of digital tokens, better verification of underlying assets. The digital tokens can be dynamically created and managed through smart contracts deployed on distributed ledger technology. The "dynamic" nature of the token creation process refers to the ability for token attributes are defined "on-the-fly" by network participants either at the time token is created or at a later date, token attributes can also be altered by authorized network participants. Third party systems may be enabled where certain token attributes may be inherited from a third party database, or may require a separate status to be assigned (e.g., unverified or verified) that may be updated by either a participant with relevant permissions (e.g., an token administrator) or via a link to an applicable trusted third party system via an application programming interface (API) (e.g., Company Registration Systems) for recordation the blockchain-based tokenization platform of who changed that identity component status.

In general practice, many digital asset tokens are created using static code, which means that the basic token standards require additional programming to define asset-specific attributes. An example of the standard is ERC 1400 series, which is normally used to express assets as tokens on a blockchain. The attributes required for a given use case must be defined before a token can be issued because the standards do not enable a token's features and functions to be defined upon or after issuance. Tokens representing specific asset classes, financial instruments, or fixed assets must be defined and coded in advance for issuance on a DLT. In contrast, the digital token enables some or all attributes that enable a digital token to represent an asset to be defined when the token is issued (or reissued) or thereafter. Digital tokens, including the attributes they require to fulfill the use-case for which they were design, are created "on the fly" based on a token-issuance computing facility that incorporates token standards, financial instrument construction, and the data elements can make up a financial instrument. This design also enables the digital token to be compatible with other DLTs, not just the Ethereum DLT or other current DLTs. This technology introduces a token creation process that provides the flexibility of defining the token characteristics at creation (or reissuance) or thereafter. Under current practice, for instance, when issuing a loan digital token this will need to have a coded attribute that defines whether or not the loan digital token is collateralized at the point of creation. This technology for dynamic token creation, introduces flexibility through the "dynamic" nature of token issuance, the loan digital token can be created in a way that fulfil either use case without having to code the attributes that would make the digital token a collateralized loan or a noncollateralized loan. The dynamic token creation process can issue either a collateralized or noncollateralized token without coding or reference to a pre-existing template. In this way, the technology process also contrasts with a traditional way of creating reusable blocks of code. The dynamic token creation does not reuse code but generates a digital token with attributes as needed at the time the token is issued (or reissued) or thereafter and avoids incorporating pre-coded blocks or templates to represent pre-coded use cases. The technology enables (1) token-creation code by enabling a user, system, or application, to interact directly with token-creation code as the token-creation code executes on the blockchain network to define, add, or remove asset-specific token attributes as and when required, (2) dynamic arrays by enabling dynamically allocated JavaScript Object Notation (JSON) data objects (e.g., dynamic arrays) to specify and configure asset attributes, such as a bond's maturity date, on-the-fly, (3) flexible attribute requirements by enabling the digital token to provide flexibility in whether attributes are mandatory or required and immutable or mutable. Since the digital token has required attributes without which the digital token cannot be issued, dynamic attributes can be both mandatory and optional and some attributes are immutable (cannot be changed) while others are mutable (can be updated). The digital token provide the flexibility to dynamically specify any combination of mandatory/optional or immutable/mutable attributes as business use cases require. The technology thereby enables digital tokens which are blockchain network agnostic to any particular current DLT (e.g., compatible with digital tokens issued on the Ethereum blockchain but can be issued on other DLTs as well). As disclosed herein, there may be a graphical user interface where a user defines or selects token attributes to correspond to a particular asset class from lists of asset attributes on a screen to construct a digital token representing a traditional asset such as a fixed-income bond. There may be an API where an application trusted by the digital token can trigger token attribute creation or changes based on an asset requirement such as a capital call. There may be a third-party service that provides data through smart contracts, where a trigger event, such as a price change updates token attributes. There may be a system message, where a file receipt such as a request for payment can create a token with the required attributes and issue it on the blockchain. Attributes can also be set in a token by other smart contracts executing in the blockchain environment.

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including identified articles, web pages, websites, products and manuals thereof) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

As shown in FIGS. 1-9, this disclosure discloses various systems and methods for digital tokens to be dynamically created within distributed network nodes. As such, the digital tokens are enabled to be dynamically created and managed through smart contracts deployed on a Distributed Ledger Technology (DLT), such as the blockchain-based tokenization platform (e.g., Ethereum). The "dynamic" nature of creating the digital token, as disclosed herein, refers to an ability for various asset-specific attributes of the digital token to be defined "on-the-fly" by network participants either at a time token is created before issuance on the blockchain-based tokenization platform (e.g., Ethereum) or at a later date after the digital token has been issued on the blockchain-based tokenization platform (e.g., Ethereum). For example, the asset-specific attributes can be altered by authorized network participants.

In general practice, many digital tokens that tokenize assets (e.g., digital asset tokens) are created using static code. Therefore, the user wanting to issue the digital token to virtually represent the asset selects the standard that the digital token will follow when issued on the blockchain-based tokenization platform (e.g., Ethereum). The set of asset-specific attributes of the asset to be encoded in the digital token are determined and are coded according to the standard, as selected by the user (e.g., within a menu presented by a dApp). For example, the standard may ERC 1400 series, as disclosed at https://polymath.network/erc-1400, which may be used to express assets as digital tokens on the DLT. The set of asset-specific attributes required for a given use case must be defined before the digital token can be issued, as disclosed at https://ethereum.org/en/developers/tutorials/create-and-deploy-a-defi-app/, because the standard, as selected by the user, does not enable the digital token's features and functions to be defined upon issuance or thereafter. As such, the digital token that may virtually represent a specific asset class, financial instrument, or fixed asset must be defined and coded in advance before issuance as the digital tokens on the DLT.

As disclosed herein, this disclosure deviates from such conventional approach by enabling some, many, most, or all asset-specific attributes that virtually represent the asset to be defined on the digital token when the token is initially issued on the blockchain-based tokenization platform (e.g., Ethereum) or thereafter. The digital token, including the set of asset-specific attributes required to fulfill a use case for which the asset-specific attributes were designed, are created dynamically based on immediate user input (e.g., via a physical or virtual keyboard) or "on-the-fly." For example, under current conventional practice, when issuing the digital token tokenizing a loan asset, the user will need to operate the menu of the dApp to have a coded asset-specific attribute that defines whether or not the loan asset is tokenized as being collateralized at creation. In contrast, this disclosure enables the digital token for the loan asset to be created in a way that can fulfil either use case without having to code the set of asset-specific attributes that would make the digital token virtually representing a collateralized loan or a non-collateralized loan. Therefore, the digital token can be issued as either a collateralized or noncollateralized virtual representation of the asset, without pre-coding or reference to a pre-existing template for the standard (e.g., ERC20, ERC1400). As such, this approach also contrasts with a traditional way of creating reusable blocks of code. For example, enabling the digital token to be created dynamically does not reuse code but generates the digital token with attributes as needed when the digital token is issued and avoids incorporation of pre-coded blocks or templates to virtually represent pre-coded use cases.

FIG. 1 shows an embodiment of a computing architecture for enabling the digital token to have the set of asset-specific attributes that may be modified or added thereto at least after the digital token is issued. In particular, a computing architecture 100 includes a user 101, a data center 104 (e.g., a physical building), and a data center 106 (e.g., a physical building). The data center 104 includes a server 102 (e.g., physical, virtual, web, application, database) and a server 103 (e.g., physical, virtual, web, application, database). The data center 106 includes a server 105 (e.g., physical, virtual, web, application, database). The user 101 includes a client (e.g., a desktop, a laptop, a tablet, a smartphone, a wearable) in communication with the server 102 or the server 103 over a network (e.g., a local area network, a wide area network, a cellular network). The data center 104 and the data center 106 are in communication with each other over a network (e.g., a local area network, a wide area network, a cellular network). Within the data center 104, the server 102 and the server 103 are in communication with each other over a network (e.g., a local area network, a storage area network).

The server 102 is programmed to interface with the user 101 to receive an input from the user 101, which includes the set of asset-specific attributes that the digital token needs to virtually represent. For example, the server 102 may present the user interface having the menu (e.g., dropdowns, textboxes) for the user to engage with to enter or select the set of asset-specific attributed. The input may also include other information relevant for creation of the digital token, as disclosed herein.

The server 103 runs a microservices architecture for communication among network components, including communication with external systems, messaging among internal systems, and communication with the DLT (e.g., the blockchain-based tokenization platform) on which the digital token will be issued. The microservices architecture may be programmed to have a dedicated microservice performing a dedicated task to enable to the digital token to be created, as disclosed herein, and then modified or added thereunto, as disclosed herein. For example, there may be a dedicated microservice for presenting the menu to the user 101, a dedicated microservice for sending the input from the user 101 to a logic for creation of the digital token, a dedicated microservice for modifying the digital token after issuance, a dedicated microservice for adding attributes to the digital token after issuance, a dedicated microservice for accessing or recalling the digital token after issuance, a dedicated microservice for reissuing the digital token as modified or added thereunto after issuances, or other dedicated microservice for computing tasks or actions disclosed herein.

The server 105 may function as a node of the DLT (e.g., the blockchain-based tokenization platform). For example, the server 105 may host a copy of the blockchain of the blockchain-based tokenization platform. As such, based on requests from the user 101, as communicated to the server 105 through the server 102 and the server 103, the server 105 may issue the digital token, as disclosed herein, with the digital token having the set of asset-specific attributes sourced from the input from the user 101. The set of asset-specific attributes may be modifiable or appendable thereto after the digital token is issued, as disclosed herein. Note that the DLT on which the digital token may be issued can be of various types, functionalities, and configurations (e.g., Ethereum, Hyperledger Sawtooth, Corda).

FIG. 2 shows an embodiment of a software stack for enabling the digital token to have the set of asset-specific attributes that may be modified or added thereto at least after the digital token is issued. In particular, a software stack 200 runs on top of the computing architecture 100. The software stack 200 includes a user 201, a tokenization platform 206, and a services host 207. The user 201 (e.g., an application, a browser, an add-on for browser, a mobile app, a messaging interface) is hosted via the user 101. The tokenization platform 206 is hosted via the data center 104. For example, the tokenization platform 206 may include or enable a web application (e.g., a dApp) that may interface with the smart contract on the blockchain-based tokenization platform (e.g., Ethereum, Hyperledger Sawtooth, Corda). The services host 207 is hosted via the data center 106. For example, the services host 207 may be in communication with or be a node of the blockchain-based tokenization platform (e.g., Ethereum, Hyperledger Sawtooth, Corda).

The tokenization platform 206 includes an interface 202, a Representational State Transfer (REST) application programming interface (API) 203, a DLT microservices 204, and an encryption vault 205. The server 102 runs the interface 202 to present the menu to the user 101, receive the input therefrom, and pass the input downstream within the tokenization platform 206 to the DLT microservice 204 through the REST API 203. The interface 202 may include a graphical user interface for human input or a messaging interface from external financial asset electronic systems (e.g., electronic trading platforms, data warehouses). The server 103 runs the DLT microservices 204 via the microservices architecture. The server 103 runs the REST API 203. The server 103 hosts the encryption vault 205. The interface 202 is in communication with the DLT microservices 204 via the REST API 203, although other ways of communication with the DLT microservice 204 are possible. Note that the REST API 203 may be used to communicate with the DLT microservices 204, within the DLT microservices 204, or from the DLT microservices 204.

The services host 207 includes a REST API 210, a DLT virtualization layer 209, and a copy of a blockchain of a DLT network 208. The server 105 hosts the REST API 210, the virtualization layer 209, and the copy of the blockchain of the DLT network 208. The REST API 210 is in communication with the DLT virtualization layer 209. The DLT virtualization layer 209 is in communication with the copy of the blockchain of the DLT network 208. The DLT virtualization layer 209 is logically interposed between the REST API 210 and the copy of the blockchain of the DLT network 208. The DLT microservices 204 is in communication with the REST API 210 and vice versa. The DLT microservices 204 may be dedicated to the DLT virtualization layer 209 specific to the copy of the blockchain of the DLT network 208.

The software stack 200 is thereby enabled to dynamically create the digital token with the set of asset-specific attributes for the asset based on the set of asset-specific attributes and the standard input by the user 201, as disclosed herein. For example, the user 201 may interact with the tokenization platform 206, whose logical components that create, issue, and manage the digital token with the asset-specific attributes, as disclosed herein. Note that the asset for the digital token is held by a custodian agent, which may be an entity that is different from an entity that operates the computing architecture 100 and the software stack 200 or the entity that operates the computing architecture 100 and the software stack 200 may be the custodial agent. Regardless, based on the input from the user 201, the REST API 203 may instruct the DLT microservice 204 to create, retrieve, send, receive, or process messages to the services host 207 for receipt by the REST API 210 to pass to the DLT virtualization layer 209, which in-turn performs relevant actions with respect the copy of the blockchain 208 of the DLT network 208. When needed, a similar but reverse communication path may be traveled to the DLT microservice 204 for handling. For example, to dynamically create the digital token, as disclosed herein, there may be HTTP POST calls are made for Token Issuance, Token Set Attributes, Token Set Immutables, or other relevant or suitable commands. Likewise, results of POST calls are communicated from the services host 207 using various key-value pair responses. For example, such key-value responses may be embodied as or within a JavaScript Object Notation (JSON) content or another file format or data interchange format that uses human-readable text to store and transmit data objects consisting of attribute-value pairs and arrays (or other serializable values).

The DLT microservice 204 may contain an event bus that routes messages within the DLT microservice 204 or for receipt of messages sent to the DLT microservice 204 from external to the DLT microservice 204 or for sending of messages from the DLT microservice 204 downstream, as disclosed herein. Such messages may be from external banking and financial applications (e.g., web applications external to the tokenization platform 206 or the services host 207) that provide messaging or financial instrument input required for dynamic creation of the digital token triggered by the input from the user 201 to the interface 202 and required by the DLT network 208, including a transfer of token creation and management instructions. The REST API 203 may be configured to receive such messages before the event bus, within the event bus, or when the event bus routes such messages downstream, as disclosed herein.

The digital token and communications between the DLT microservice 204 and the DLT network 208 are encrypted by keys stored in and accessed through the encryption vault 205. To issue the digital token, as disclosed herein, various relevant instructions, which may be encrypted via the encryption vault 205, are sent from the DLT microservice 204 to the DLT virtualization layer 209 through the REST API 210 and are received by the DLT virtualization layer 209. This virtualization software converts token issuance REST API calls into a digital token structure required by the DLT network 208 and communicates status messages back to the DLT microservices 204 through the REST API 210 calls.

FIG. 3 shows an embodiment of the digital token enabled to have the set of asset-specific attributes that may be modified or added thereto at least after the digital token is issued. In particular, the digital token, as disclosed herein, has a structure 300 that provides various technical capabilities to enable dynamic creation of the digital token, as disclosed herein. When the digital token is issued on the blockchain-based tokenization platform, the digital token has the structure 300 contain a header component 301, an attribute component 302, and an immutable component 303, which are logically separate and distinct from each other, although at least two of such components may be a single logical component. After the digital token is issued on the blockchain-based tokenization platform, the digital token can be searchable by a content of the header component 301, a content of the attribute component 302, or a content of the immutable component 303, as disclosed herein.

The header component 301 (e.g., a set of fields, a set of strings, a set of files) contains at least some basic information for the asset the digital token virtually represents. This basic information includes an identifier for the asset, a total supply content, a version content, a creation date, or others, if needed. For example, after the digital token is issued on the blockchain-based tokenization platform, the digital token can be searchable by the identifier for the asset, the total supply content, the version content, the creation date, or others.

The identifier for the asset includes a unique value to identify the asset (e.g., US018331001). For example, the identifier for the asset can be a Committee on Uniform Security Identification Procedures (CUSIP) identifier (e.g., a nine digit or character numeric or alphanumeric, 037833100, 38259P508), an International Securities Identification Number (ISIN) identifier (e.g., a 12-character alphanumeric code, US0378331005), an Stock Exchange Daily Official List (SEDOL) identifier (e.g., a string having seven characters in length formed by a six-place alphanumeric code and a trailing check digit, 0263494), or other suitable identifier. The identifier for the asset is set at a time of issuance of the digital token on the blockchain-based tokenization platform and cannot be changed at any time during the asset's life cycle while the digital token is issued on blockchain-based tokenization platform. When the digital token is issued on blockchain-based tokenization platform, the identifier for the asset may be used to link the asset with traditional software systems if needed. While the digital token is issued on blockchain-based tokenization platform, the identifier may also be used to manage the asset, including transfer, update, and dissolution.

The total supply content virtually represents a total of authorized shares of the asset at issuance of the digital token on the blockchain-based tokenization platform. The total supply content is a fixed number set at a time of issuance of the digital token on the blockchain-based tokenization platform. The fixed number that remains unchanged for a life cycle of the asset while the digital token is issued on blockchain-based tokenization platform. The fixed number corresponds to a total sum of all shares of the asset of all owners at the time when the digital token is issued on the blockchain-based tokenization platform. For example, the fixed number can be 200 or 1000000.00 or another suitable number.

The version content contains a versioning detail or a version identifier specific to the asset while the digital token is issued on the blockchain-based tokenization platform. For example, the versioning detail or the version identifier can be v0.1.24rc or another suitable versioning content.

The creation date is a date stamp, which may include a time stamp, when the digital token was issued on the blockchain-based tokenization platform. The creation date is fixed at issuance of the digital token on the blockchain-based tokenization platform and cannot be changed while the digital token is issued on the blockchain-based tokenization platform. For example, the date stamp can include 03/22/2020 or 16/04/2022_05:45 pm ET or 04/08/2025/2312.

The attribute component 302 (e.g., a set of fields, a set of strings, a set of files) is a dynamic component of the digital token that enables issuing of the digital token with the set of asset-specific attributes that can be modified or added or appended thereto with wide ranging characteristics on-the-fly, which may be before, at, or after the digital token is issued on the blockchain-based tokenization platform, as disclosed herein. The attribute component 302 contains the set of asset-specific attributes that are organized in a multi-level hierarchy that allows for comprehensive multi-level grouping of various characteristics of the digital token. For example, if the digital token tokenizes a real estate asset held in custody of the custodian agent, then the attributes component 302 may contain Level 1 attributes including Basic attributes (e.g., location, deed, dimensions, survey), Document attributes or links thereto or documents themselves (e.g., mortgage), or Payment schedule. This level allows for adding arbitrarily names groups (e.g., Amortization Table). Likewise, if the digital token tokenizes a bond held in custody of the custodian agent, then the attributes component 302 may contain the Basic attributes can have further sub-attributes, i.e., Level 2 of the Basic group can include characteristics of a financial asset (e.g., Coupon Rate, Day Count).

The attributes component 302 is structured in accordance with a dynamic attributes structure 303. For example, all levels of attribute component 302 may use the dynamic attributes structure 303. The dynamic attributes structure 303 includes attributes that are dynamic and are virtually represented with or by a dynamically allocated JSON data objects (e.g., dynamic arrays) to specify and configure assets using JSON key-value pairs 304. For example, the JSON data objects may be dynamic entities that are instances of % DynamicObject or % DynamicArray, which are designed to integrate JSON data manipulation seamlessly into ObjectScript applications, where JSON literal constructors allow creation of dynamic entities by directly assigning a JSON string to a variable (docs.intersystems.com/irislatest/csp/docbook/DocBook.UI.Page.cls?KEY=GJSON_CREATE). For example, after the digital token is issued on the blockchain-based tokenization platform, the digital token can be searchable by the key-value pairs 304. Note that JSON technology is not required and other suitable key-value pair technologies may be used, whether additionally or alternatively.

Token Attributes are structured using JSON key-value pairs as follows:
Attributes
   group 1
   key 1: value 1
   key 2: value 2
   group 2
   key 1: value 1
   key 2: value 2
For example:
Attributes
basicAttributes
AssetClass
AssetType
CouponRate
. . . <many more if needed>
documents
document name: link to document In this implementation, the values are defined as objects. The values can be data strings, other key-value pairs, or other programs, including other DLT tokens. This provides additional flexibility for how attributes can be created and what types of assets attributes in a token can virtually represent. As disclosed herein, the attributes component 302 enables the digital token with the set of asset-specific attributes, where the set of asset-specific attributes is modifiable or enabled to receive the new asset-specific attribute at least after the digital token with the set of asset-specific attributes is issued on the blockchain-based tokenization platform based on the standard. This allows the digital token containing the attribute component with the set of key-value pairs populated with the subset of the set of asset-specific attributes, where the set of key-value pairs is programmed to be modified or have the new key-value pair being added thereto after the digital token is issued on the blockchain-based tokenization platform based on the standard. As such, the user is able to modify the set of asset-specific attributes encoded into the digital token or add new asset-specific attributes for encoding into the digital token. Likewise, if the standard changes after the digital token with the set of asset-specific attributes is issued the blockchain-based tokenization platform based on the standard, then the user may be able to keep up (e.g., maintain) with such changes when the user desires for the digital token with the set of asset-specific attributes to remain compliant with the standard, as changed. Similarly, if the new standard is developed/introduced after the digital token with the set of asset-specific attributes is issued the blockchain-based tokenization platform based on the standard, then the user may adapt the digital token with the set of asset-specific attributes, as issued the blockchain-based tokenization platform based on the standard, to the new standard.

Dynamic attributes can be both mandatory and optional. Similarly, some attributes are immutable (cannot be changed) while others are mutable (can be changed). The digital asset token with the set of asset-specific attributes, as disclosed herein, provides at least some flexibility to dynamically specify any combination of mandatory/optional or immutable/mutable attributes as business use cases require. As such, the immutable component 303 (e.g., a set of fields, a set of strings, a set of files) is another component of the token. The immutable component 303 is similar in structure to the attribute component 302, with an important difference that information added to the immutable component 303 cannot be altered or removed. This enables support for specifying other ways of authenticating at least some physical, real, or financial assets that are virtually represented by the digital token, such as a signature mark by a third party off the DLT network 208, including a regulator or financial institution. For example, after the digital token is issued on the blockchain-based tokenization platform, the digital token can be searchable by a key-value pair therein.

FIG. 4 shows an embodiment of a set of functions of the digital token enabled to have the set of asset-specific attributes that may be modified or added thereto at least after the digital token is issued. In particular, the digital token with the set of asset-specific attributes, as disclosed herein, has (or is callable by) a set of functions 400. Based on the structure 300, as implemented via the software stack 200 running on the computing architecture 100, the digital token may be agnostic to at least one, two, three, four, five, six, seven, eight, nine, ten, or more, or any particular DLT (e.g., Ethereum, Hyperledger Sawtooth, Corda). The set of functions 400 provides unique characteristics for inclusion in the digital token and functions that may be included in other standards (e.g., ERC20, ERC1404), as indicated between parenthesis in FIG. 4.

The Update function 401 changes mutable attributes of the digital token as follows:
Set Attribute 402—Updates an existing attribute or adds a a new attribute or attribute group using JSON key-value pairs to the attribute component 302.
Set Immutable 403—Adds an immutable attribute to the immutable section.
Transfer (ERC20) 404—Enables a transfer of a fractional share of the asset from one entity to another, secured by the owner's private key (e.g., via the encryption vault 205).
Name (ERC20) 405—Returns the name of the asset.
Symbol (ERC20) 406—Returns the Symbol of the asset.
TotalSupply (ERC20) 407—Gets the total supply of the asset.
BalanceOf (ERC20) 408—Returns the balance of specific wallet address.
detectTransferRestriction (ERC1404) 409—Detects and restricts transactions based on regulatory and compliance requirement.
messageForTransferRestriction (ERC1404) 410—Sends a restricted transaction error code to a text message.

The digital token, as disclosed herein, enables a variety of investment types (e.g., assets) to be virtually represented as the digital token on the computing architecture 100 running the software stack 200. For example, the digital token, as disclosed herein, may enable Traditional Electronic Investments: traditional electronic assets (e.g. equities, fixed income) that are created entirely in an electronic dematerialized form within a central database that records legal asset ownership and transactions. For example, the digital token, as disclosed herein, may enable Traditional Physical Investments: traditional physical assets (e.g. commodities, diamonds, cars, art, gold) that are created in a physical material form and held securely by a trusted custodian entity that records assets held for custodian clients in a proprietary database of asset ownership and transactions. For example, the digital token, as disclosed herein, may enable New Digital Assets: new digital assets (e.g. investments, cryptocurrencies, fiat-currencies) that are created in digital form directly on the DLT platform 208 that records ownership and transactions. For example, the digital token, as disclosed herein, may enable Token Creation Smart Contract: creation of digital tokens with dynamically defined attributes. Different assets with diverse characteristics can be virtually represented using a same basic smart contract and stored on the DLT platform 208.

These features may enable use cases that include Token Documentation & Repository Smart Contract, where a token record may require a reference to a document (e.g., a productivity document, a portable document format (PDF) file, an image file, a video file, an audio file, an MS Word file) that virtually represents a particular investment attribute (e.g. scan of company registration information, memorandum of understanding). In this case, the computing architecture 100 with the software stack 200 running thereon stores a document file within a document repository (e.g., on the server 103 or accessible to the server 103 or within the data center 104) and execute a token documentation smart contract to generate a document hash value that is stored within the token record using a one directional mathematical hashing function.

These features may enable use cases that include Third Party Systems, where certain token attributes may be inherited from a third party database, or may require a separate status to be assigned (e.g., unverified or verified) that may be updated by either a participant with relevant permissions (e.g., an token administrator) or via a link to an applicable trusted third party system via an API (e.g., Company Registration System). The computing architecture 100 with the software stack 200 running thereon will record on the DLT network 208 an entity that changed an identity component status.

These features may enable use cases that include Token Relationship Linkages/Hierarchy, where the computing architecture 100 with the software stack 200 running thereon enables token relationship linkages and hierarchies to be established between various token records, associated records may inherit token attributes from a parent token using smart contracts on the DLT network 208.

In one mode of operation, a method may comprise: presenting, by the server 103, the user interface (e.g., a visual menu, a visual wizard) to the client (e.g., a desktop, a laptop). The user interface may be programmed to receive (a) the set of asset-specific attributes for the digital token to tokenize the asset (e.g., a building) of the asset type (e.g., real estate) and (b) the identifier of the blockchain-based tokenization platform (e.g., Ethereum) from the set of identifiers of the set of blockchain-based tokenization platforms (e.g., Ethereum, Corda, Hyperledger) capable of hosting the digital token having the set of asset-specific attributes. For example, the user interface may be presented via a dApp. The method may further comprise receiving, by the server, the set of asset-specific attributes and the identifier of the blockchain-based tokenization platform from the client (e.g., based on interacting with the user interface). The method may further comprise generating, by the server, the digital token based on the set of asset-specific attributes and the identifier of the blockchain-based tokenization platform such that the digital token contains the header component, the attribute component, and the immutable component, as shown in FIG. 3. The header component contains the identifier for the asset and the version for the asset, as per FIG. 3. The attribute component contains the first set of attributes for the asset type including the first set of key-value pairs populated with the first subset of the set of asset-specific attributes (e.g., all, less than all), as per FIG. 3. The first set of key-value pairs is programmed to be modified or have the new key-value pair being added thereto after the digital token is issued on the blockchain-based tokenization platform based on the identifier of the blockchain-based tokenization platform. The immutable component contains the second set of attributes for the asset type including the second set of key-value pairs populated with the second subset of the set of asset-specific attributes (e.g., all, less than all), as per FIG. 3. The second set of key-value pairs is programmed to not be modifiable or removable after the digital token is issued on the blockchain-based tokenization platform based on the identifier of the blockchain-based tokenization platform. The method may further comprise issuing, by the server, the digital token on the blockchain-based tokenization platform based on the identifier of the blockchain-based tokenization platform. The method may further comprise presenting, by the server, the user interface to the client after the digital token is issued on the blockchain-based tokenization platform based on the identifier of the blockchain-based tokenization platform. The user interface may be programmed to receive a user input from the client, where the user input includes the identifier for the asset, the version of the asset, and a content (e.g., an instruction, a command, or a request to modify or append to attribute component of FIG. 3). The method may comprise taking, by the server, the action with respect to the digital token after the user input is received based on identifying the digital token via the identifier for the asset and the version of the asset (e.g., by recalling the digital token). The action may include modifying the first set of key-value pairs based on the content or adding the new key-value pair to the first set of key-value pairs based on the content (or something else). The method may include reissuing, by the server, the digital token on the blockchain-based tokenization platform based on the identifier of the blockchain-based tokenization platform after the action is taken with respect to the digital token, which may occur without issuing a new digital token.

Note that the first subset of the set of asset-specific attributes and the second subset of the set of asset-specific attributes may share at least one asset-specific attribute which involves certain types of tokenization use cases (e.g., tokenization specific attributes may need to be shared). However, the first subset of the set of asset-specific attributes and the second subset of the set of asset-specific attributes may not share any asset-specific attributes, which may involve other types of tokenization use cases (e.g., tokenization specific attributes are not shared). In other situations, the second subset of the set of asset-specific attributes is a copy of the first subset of the set of asset-specific attributes, which may be useful in other tokenization use cases (e.g., tokenization specific attributes may need to be cloned).

FIG. 5 shows an embodiment of a computing architecture for enabling the digital token to have the set of asset-specific attributes that may be modified or added thereto at least after the digital token is issued while the digital token is enabled to reference or contain a document with a human-readable text specific to the digital token. In particular, a software stack 500 is similar to the software stack 200. The software stack 500 includes a user 501, a tokenization platform 502, a storage 510, and a digital token 504 having an immutable attribute 509, as disclosed herein. The user 501 includes the user 201, which is hosted via the user 101. The tokenization platform 502 includes the tokenization platform 206 hosted via the server 102 and the server 103 in the data center 104. The tokenization platform 502 includes a file 503, a DLT microservice 505, an encryption vault 506, an encrypted file 507, and a hash value 508. The DLT microservice 505 includes the DLT microservice 204. The encryption vault 506 includes the encryption vault 205. External to the tokenization platform 502, the software stack 500 includes the storage 510 (e.g., a database, a relational database, an in-memory database, a NoSQL database, a productivity document suite) and the digital token 504 having the immutable attribute 509, as disclosed herein. The digital token 504 includes the structure 300. The immutable attribute 509 includes the immutable component 305.

Collectively, the software stack 500 enables token documentation and repository smart contract technology including a technique for relating additional documentation to the digital token 504 that uses the smart contract for immutable reference on blockchain nodes. For example, the digital token 504 may require a reference (e.g., a link, an address, a pointer) to a document (e.g., a productivity document, a PDF file, an image file, an image file, a video file, an audio file, an MS Word file) that discloses, references, or virtually represents a particular investment attribute (e.g., a scan of company registration information, memorandum of understanding). In this case, the computing architecture 100 with the software stack 500 running thereon stores a document file (e.g., a productivity document, a PDF file, an image file, an image file, a video file, an audio file, an MS Word file) within a document repository (e.g., the storage 510) and executes a token documentation smart contract to generate a document hash value that is stored within the digital token 504 using a one-directional mathematical hashing function. In particular, many digital tokens 504, as disclosed herein, may require that external documentation be referenced by token holders and investors. External documentation may not be available when those digital tokens 504 may be issued on the blockchain-based tokenization platform. Additionally, such documentation may accumulate over life of the digital tokens 504. Under conventional token-creation methods, external documentation cannot be added to the digital tokens 504, as issued, and new digital tokens must be created, which may not always be desired or possible.

In contrast, the digital token 504, as disclosed herein, enables new attributes to be dynamically added to the digital token 504 after the digital token 504 is issued or reissued on the blockchain-based tokenization platform, thereby enabling references to external documentation as that documentation is created/modified and required. Furthermore, documentation references can be added through cryptographic hashing that guarantees that such respective document has not been altered since that document was referenced in the digital token 504. This functionality may be enabled by the user 501 uploading the file 503 related to the digital asset token 504 virtually representing the asset, as disclosed herein. This may occur after the digital token 504 has been issued or reissued on the blockchain-based tokenization platform. The file 503 may include a human-readable descriptive text, usually in a plain text format, although other type of content is possible (e.g., barcodes). The file 503 may include (or refer, point, or link to) a productivity document, a PDF file, an image file, an image file, a video file, an audio file, an MS Word file, or another suitable file. The file 503 can be a legal contract, a technical illustration, a photographs, or other documentation related to the asset virtually represented by the digital token. The DLT microservice 505 encrypts the file 503 through the encryption vault 506 to form an encrypted file 507. The encrypted file 507 is now identified by a cryptographic hash value 508, which identifies the encrypted file 507, is required to decrypt the encrypted file 507 into the file 503, and ensures that the encrypted file 507 has not been changed. The DLT microservice 505 instructs the encrypted file 507, as identified by the hash value 508, be stored on the external file storage 510. The digital token 504 is dynamically generated, as disclosed herein, and new attributes can be added to the digital token 504 on-the-fly, as disclosed herein. Using the structure 300 shown in FIG. 3, the DLT microservice 505 adds or requests to add the hash value 508 as the immutable attribute 509 to the digital token 504, which may be before, during, or after issuance of the digital token on the blockchain-based on platform, as disclosed herein. Therefore, the hash value 508 may be written into the immutable attribute 509. For example, the hash value 508 may be written into a new key-value pair within the second set of key-value pairs without (a) modifying or removing the second subset of the set of asset-specific attributes already recited in the second set of key-value pairs from the second subset and (b) creating a new digital token such that the encrypted file 507 is linked to the digital token 504 for retrieval from the storage 510 and decryption thereof by the server 103 via the hash value 508 after the digital token 504 is issued on the blockchain-based tokenization platform based on the identifier of the blockchain-based tokenization platform. The DLT microservice 505 adding or requesting to add the hash value 508 to the new key-value pair within the immutable attribute 509 to the digital token 504 may occur before or after the encrypted file 507 is sent from the tokenization platform 502 (e.g., via the server 103) to the storage 510. As a result, the encrypted file 507 is now linked to the digital token 504 for retrieval from the storage 510 and decryption by the server 103 via the hash value 508, whether within or via the encryption vault 506 or not.

FIG. 6 shows an embodiment of a computing architecture for enabling the digital token to have the set of asset-specific attributes that may be modified or added thereto before or after the digital token is issued while the digital token is enabled to link to information in a third-party computing system. In particular, a software stack 600 is similar to the software stack 500 or the software stack 200. The software stack 600 includes a third-party software application 602, a tokenization platform 603, and a digital token 607 having an attribute 608. The third-party software application 602 may include the client 201 hosted on the client 101 or be a software application (e.g., a web application, a microservices application, a dApp, a mobile app) external to the tokenization platform 206. The tokenization platform 603 includes the tokenization platform 502 or the tokenization platform 206 hosted via the server 102 and the server 103 in the data center 104. The tokenization platform 603 includes a DLT microservice 604, an encryption vault 605, and an identifier (ID) attribute value 606. The DLT microservice 604 can include the DLT microservice 505 or the DLT microservice 204. The encryption vault 605 can include the encryption vault 506 or the encryption vault 205. Collectively, the software stack 600 enables a technique for linking information in a third-party system, such as an account in an online banking system, to the digital token 607, where the third party system includes the third party software application 602.

Some processes may require that an attribute (e.g., a value, a numeric value, an alphanumeric value) of the asset (e.g., a financial instrument, a bond, a real estate item, a commodity) be inherited (e.g., copied) onto the digital token 607 from third-party software application 602 outside of the DLT network 208 and the tokenization platform 603. Such attribute may be statically linked to the third-party software application 602, or may require periodic updating by some network participants (e.g., blockchain nodes) with relevant permissions. The technique, as disclosed herein, links the DLT network 208 and the third-party software application 602 through the digital token 607 to contain a record on the DLT network 208 of any entity that changes a virtual representation of the asset in any way. For example, the digital token 607 is generally issued to manage digital currencies and financial instruments stored on the DLT network 208. There are instances, however, when financial transactions require references to assets and systems on both the DLT network 208 and traditional financial applications and databases (e.g., the third party software application 602). Therefore, a mechanism that bridges digital currencies and traditional fiat currencies may be required. Therefore, the digital token 607 enables an addition of the attribute of the asset to the digital token 607, where the attribute virtually represents identification schemes used by the third party software application 602 outside of the DLT network 208 and the tokenization platform 603 used by the digital token 607. Furthermore, the software stack 600 can issue or reissue the digital token 607 using at least two, three, four, five, six, seven, eight, nine, ten, or more DLT protocols that may be computationally/operably different from each other. This DLT-agnostic design coupled with an ability to add the attribute to the digital token 607 on-the-fly provides a computing bridge between the digital token 607 and traditional asset computing systems without tying token issuers (e.g., the tokenization platform 603) to only one specific current blockchain protocol. For example, in some situations, this DLT-agnostic design coupled with the ability to add the attribute to the digital token 607 on-the-fly provides the computing bridge between digital token 607 and traditional asset computing systems without tying token issuers (e.g., the tokenization platform 603) to any specific current blockchain protocol.

The software stack 600 may be used to enable the digital token 607 to virtually incorporate the attribute or the asset referenced on a conventional computing financial system (e.g., electronic trading platform). The third-party software application 602 contains an identifier (ID) 601 that virtually represents the attribute or the asset on the third-party software application 602 and sends the ID 601 (e.g., a copy thereof) to the tokenization platform 603 to be received by the DLT microservice 604. For example, the ID 601 can include a unique value to identify the asset (e.g., US018331001). For example, the ID 601 can be a CUSIP identifier, an ISIN identifier, a SEDOL identifier, or other suitable identifier. For example, the ID 601 can virtually represent account numbers, security identifiers, or other suitable identifiers. The third-party software application 602 may also send system identification data (e.g., a copy thereof) for the third-party software application 602 to the tokenization platform 603 to be received by the DLT microservice 604. The third-party software application 602 sends the ID 601 (and optionally the system identification data for the third-party software application 602) to the tokenization platform 603 to be received by the DLT microservice 604 through a direct or indirect connection, an API, a manual user input (e.g., a physical or virtual keyboard), or other suitable ways. The DLT microservice 604 receives the ID 601 (and optionally the system identification data for the third-party software application 602). Then, the DLT microservice 604 encrypts the ID 601, which may include encrypting the system identification data for the third-party software application 602, through the encryption vault 605 to virtually represent the ID 601 (and optionally the third-party software application 602) as the ID attribute value 606, which may be embodied as a cryptographic hash, of the attribute of the asset.

The ID attribute value 606, as encrypted via the encryption vault 605, is added to the digital token 607 (e.g., the attribute component 302) as the attribute 608, whether the digital token 607 is already existing at that time, being newly created, being reissued, or already reissued. The ID attribute value 606, as encrypted via the encryption vault 605, is added (e.g., dynamically) to the digital token 607 as the attribute 608 to the key-value pairs 304 in the attribute component 302 of the digital token 607 as a new key-value pair within the first set of key-value pairs without modifying or removing the first subset of the set of asset-specific attributes already recited in the first set of key-value pairs. As the digital token 607 is changed or updated later (e.g., the new key-value pair of the attribute 608), the blockchain-based tokenization platform records any updates and a specific party that made those updates, thereby providing (a) an immutable audit trail of changes in the status of the digital asset 607 and (b) the ID 601, as encrypted via the cryptographic hash 606, from the third-party application 602 to the server 103.

FIG. 7 shows an embodiment of a computing architecture for enabling the digital token to have the set of asset-specific attributes that may be modified or added thereto at least after the digital token is issued while the digital token is enabled to linked to another digital token in a serial manner or through an inheritance manner. In particular, a software stack 700 includes a first digital token 701, a tokenization platform 702, and a second digital asset token 702 having an attribute 707. The tokenization platform 702 can include the tokenization platform 603, the tokenization platform 502, or the tokenization platform 206 hosted via the server 102 and the server 103 in the data center 104. The tokenization platform 702 can include a DLT microservice 703, an encryption vault 704, an ID value 705. The DLT microservice 703 can include the DLT microservice 604, the DLT microservice 505, or the DLT microservice 204. The encryption vault 704 can include the encryption vault 605, the encryption vault 506, or the encryption vault 205. The first digital token 701 or the second digital token 706 can include the digital token 607, the digital token 504, or other digital tokens, whether or not including the structure 300 or enabling the set of functions 400. Collectively, the software stack 700 enables token relationship linkages via a technique for linking digital tokens in a serial fashion or through parent-child relationships. For example, some digital token relationship linkages and hierarchies may be established between various digital token records and associated records may reference other digital tokens on a blockchain and inherit token attributes from a parent digital token.

The digital token is generally issued as single digital token designed for a single task, such as transferring a payment, conferring ownership of the asset, or others. In some cases, however, the digital token may represent an entity that has multiple parts, each of which has its own asset or transaction flows associated with it. With digital tokens issued to fulfill a single transaction function, at least some portion of ongoing transaction or audit chain can be lost. Therefore, the digital token, as disclosed herein, enables one digital token to reference other digital tokens, be with sub-transactions stemming from a contract digital token in a parent-child hierarchy or a pair or string of digital tokens that need to be directly related and referenced to maintain contract accountability or audit integrity.

The digital token may need to reference one or more related digital tokens. The first digital token 701 or the second digital token 706 may be embodied as any digital token disclosed herein whether before, during, or after issuance or reissuance. For example, each of the first digital token 701 and the second digital token 706 has the structure 300 but may differ in header component 301 from each other (although can be same too) or in keys or values from each other within the attribute component 302 or the immutable component 305. Using the software stack 700, the first digital token 701 virtually represents one part of a transaction chain or assets transferred to the tokenization platform 702. Software applications (e.g., the third-party software application 602) can transfer IDs to the tokenization platform 702 through direct connections, APIs, manual input, or other suitable ways. The DLT microservice 703 receives a set of identification data for the first digital token 701 and encrypts the set of identification data through the encryption vault 704 to represent the first digital token 701 as the token ID value 705 in form of a cryptographic hash. The token ID value 705 is added to the second digital token 706. Using the structure 300 shown in FIG. 3, the attribute 707 is dynamically added to the attributes component 302 (e.g., as a new key-value pair) of the second digital token 706 such that the cryptographic hash value is written into a new key-value pair within a set of key-value pairs within the second digital token 706 without modifying or removing those asset-specific attributes that are already recited in the set of key-value pairs within the second digital token 706 and such that a change in the new key-value pair is recoded on the blockchain-based tokenization platform external to the data center 104 and the software application 602. As the second digital token 706 is changed or updated, the DLT network 208 records any updates and a party that made those changes or updates, thereby providing an immutable audit trail of changes in a status of the second digital token 706 while maintaining an ongoing relationship between and among the first digital token 701 and the second digital token 706.

FIG. 8 shows an embodiment of a computing architecture for enabling a user to select the blockchain-based tokenization platform on which to issue or reissue the digital token. In particular, a conventional digital token may be issued for specific blockchain technologies, generally coded by hand according to preset templates. As a result, token use cases and asset classes must be predetermined and coded for a particular blockchain, providing less flexibility and ability to respond to market requirements quickly. This is solved by the computing architecture having a DLT-agnostic token issuance engine that enables users to determine an optimum DLT for a digital token or to issue a digital token on a most competitive platform for the digital token regardless of current DLT. The digital token is blockchain and asset agnostic and designed with a dynamic and flexible structure that allows the digital token to represent large variety of financial instruments, physical assets, or digital-asset management requirements. The computing architecture enables a virtualization layer that enables a tokenization engine to create digital tokens for many types of DLTs where digital tokens can be created on the fly for any current DLT required by the user, the virtualization layer abstracts DLT-specific requirements to provide generic virtual token attributes, logical connectors within the virtualization layer create digital token attributes according to a target DLT automatically and digital tokens can be issued on multiple DLTs simultaneously.

For example, there may be a graphical user interface for selecting the blockchain-based tokenization platform on which to issue or reissue the digital token and for inputting the set of asset-specific attributes that may be modified or added thereto at least after the digital token is issued or reissued. In particular, as the user interacts with the virtualization layer of FIG. 8 to create the digital token in a wide variety of methods based on the graphical user interface. The graphical user interface enables the user users to select a target DLT for the digital token from a list of available options, as disclosed herein.

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A method comprising:
    presenting, by a server, a user interface to a client, wherein the user interface is programmed to receive (a) a set of asset-specific attributes for a digital token to tokenize an asset of an asset type and (b) an identifier of a blockchain-based tokenization platform from a set of identifiers of a set of blockchain-based tokenization platforms capable of hosting the digital token having the set of asset-specific attributes;
    receiving, by the server, the set of asset-specific attributes and the identifier of the blockchain-based tokenization platform from the client;
    generating, by the server, the digital token based on the set of asset-specific attributes and the identifier of the blockchain-based tokenization platform such that the digital token contains a header component, an attribute component, and an immutable component, wherein the header component contains an identifier for the asset and a version for the asset, wherein the attribute component contains a first set of attributes for the asset type including a first set of key-value pairs populated with a first subset of the set of asset-specific attributes, wherein the first set of key-value pairs is programmed to be modified or have a new key-value pair being added thereto after the digital token is issued on the blockchain-based tokenization platform based on the identifier of the blockchain-based tokenization platform, wherein the immutable component contains a second set of attributes for the asset type including a second set of key-value pairs populated with a second subset of the set of asset-specific attributes, wherein the second set of key-value pairs is programmed to not be modifiable or removable after the digital token is issued on the blockchain-based tokenization platform based on the identifier of the blockchain-based tokenization platform;
    issuing, by the server, the digital token on the blockchain-based tokenization platform based on the identifier of the blockchain-based tokenization platform;
    presenting, by the server, the user interface to the client after the digital token is issued on the blockchain-based tokenization platform based on the identifier of the blockchain-based tokenization platform, wherein the user interface is programmed to receive a user input from the client, wherein the user input includes the identifier for the asset, the version of the asset, and a content;
    taking, by the server, an action with respect to the digital token after the user input is received based on identifying the digital token via the identifier for the asset and the version of the asset, wherein the action includes modifying the first set of key-value pairs based on the content or adding the new key-value pair to the first set of key-value pairs based on the content; and
    reissuing, by the server, the digital token on the blockchain-based tokenization platform based on the identifier of the blockchain-based tokenization platform after the action is taken with respect to the digital token.

2. The method of claim 1, further comprising:
    presenting, by the server, the user interface to the client after the digital token is issued on the blockchain-based tokenization platform based on the identifier of the blockchain-based tokenization platform, wherein the user interface is programmed to receive the identifier for the asset, the version of the asset, and a selection of a file containing a human-readable descriptive text that discloses, references, or represents a particular investment attribute of the asset;
    receiving, by the server, the identifier for the asset, the version of the asset, and a copy of the file based on the selection after the digital token is issued on the blockchain-based tokenization platform based on the identifier of the blockchain-based tokenization platform;
    encrypting, by the server, the copy such that an encrypted file is formed and the encrypted file is identified by a cryptographic hash value after the digital token is issued on the blockchain-based tokenization platform based on the identifier of the blockchain-based tokenization platform;
    sending, by the server, the encrypted file to be stored on a storage external to the server and the blockchain-based tokenization platform after the digital token is issued on the blockchain-based tokenization platform based on the identifier of the blockchain-based tokenization platform;
    identifying, by the server, the digital token via the identifier for the asset and the version of the asset after the digital token is issued on the blockchain-based tokenization platform based on the identifier of the blockchain-based tokenization platform; and
    causing, by the server, the cryptographic hash value to be written into a new key-value pair within the second set of key-value pairs without (a) modifying or removing the second subset of the set of asset-specific attributes already recited in the second set of key-value pairs and (b) creating a new digital token such that the encrypted file is linked to the digital token for retrieval from the storage and decryption thereof by the server via the cryptographic hash value after the digital token is issued on the blockchain-based tokenization platform based on the identifier of the blockchain-based tokenization platform.

3. The method of claim 1, further comprising:
    receiving, by the server, an identifier virtually representing an asset-specific attribute of the digital token from a software application hosted outside of a data center containing the server after the digital token is issued on the blockchain-based tokenization platform based on the identifier of the blockchain-based tokenization platform;
    encrypting, by the server, the identifier virtually representing the asset-specific attribute of the digital token such that an attribute value represented as a cryptographic hash is formed; and
    causing, by the server, the cryptographic hash to be written into a new key-value pair within the first set of key-value pairs without modifying or removing the first subset of the set of asset-specific attributes already recited in the first set of key-value pairs such that a change in the new key-value pair is recoded on the blockchain-based tokenization platform external to the data center and the software application.

4. The method of claim 1, wherein the digital token is a first digital token, wherein the header component is a first header component, wherein the attribute component is a first attribute component, wherein the immutable component is a first immutable component, and further comprising:
receiving, by the server, a set of identification data for the first digital token from a software application hosted outside of a data center containing the server after the digital token is issued on the blockchain-based tokenization platform based on the identifier of the blockchain-based tokenization platform;
encrypting, by the server, the set of identification data such that an attribute value represented as a cryptographic hash is formed; and
causing, by the server, the cryptographic hash to be added to a second digital token containing a second header component, a second attribute component containing a third set of key-value pairs, and a second immutable component such that the cryptographic hash is written into a new key-value pair within the third set of key-value pairs without modifying or removing those asset-specific attributes that are already recited in the third set of key-value pairs and such that a change in the new key-value pair is recoded on the blockchain-based tokenization platform external to the data center and the software application.

5. The method of claim 1, wherein the first subset of the set of asset-specific attributes and the second subset of the set of asset-specific attributes share at least one asset-specific attribute.

6. The method of claim 1, wherein the first subset of the set of asset-specific attributes and the second subset of the set of asset-specific attributes do not share any asset-specific attributes.

7. The method of claim 1, wherein the second subset of the set of asset-specific attributes is a copy of the first subset of the set of asset-specific attributes.

8. The method of claim 1, wherein the first set of key-value pairs is programmed to be modified after the digital token is issued on the blockchain-based tokenization platform based on the identifier of the blockchain-based tokenization platform.

9. The method of claim 1, wherein the first set of key-value pairs is programmed to have the new key-value pair being added thereto after the digital token is issued on the blockchain-based tokenization platform based on the identifier of the blockchain-based tokenization platform.

10. The method of claim 1, wherein the second set of key-value pairs is programmed to not be modifiable after the digital token is issued on the blockchain-based tokenization platform based on the identifier of the blockchain-based tokenization platform.

11. The method of claim 1, wherein the second set of key-value pairs is programmed to not be removable after the digital token is issued on the blockchain-based tokenization platform based on the identifier of the blockchain-based tokenization platform.

12. The method of claim 1, wherein the action includes modifying the first set of key-value pairs based on the content.

13. The method of claim 1, wherein the action includes adding the new key-value pair to the first set of key-value pairs based on the content.

14. A system comprising:
a hardware server programmed to:
present a user interface to a client, wherein the user interface is programmed to receive (a) a set of asset-specific attributes for a digital token to tokenize an asset of an asset type and (b) an identifier of a blockchain-based tokenization platform from a set of identifiers of a set of blockchain-based tokenization platforms capable of hosting the digital token having the set of asset-specific attributes;
receive the set of asset-specific attributes and the identifier of the blockchain-based tokenization platform from the client;
generate the digital token based on the set of asset-specific attributes and the identifier of the blockchain-based tokenization platform such that the digital token contains a header component, an attribute component, and an immutable component, wherein the header component contains an identifier for the asset and a version for the asset, wherein the attribute component contains a first set of attributes for the asset type including a first set of key-value pairs populated with a first subset of the set of asset-specific attributes, wherein the first set of key-value pairs is programmed to be modified or have a new key-value pair being added thereto after the digital token is issued on the blockchain-based tokenization platform based on the identifier of the blockchain-based tokenization platform, wherein the immutable component contains a second set of attributes for the asset type including a second set of key-value pairs populated with a second subset of the set of asset-specific attributes, wherein the second set of key-value pairs is programmed to not be modifiable or removable after the digital token is issued on the blockchain-based tokenization platform based on the identifier of the blockchain-based tokenization platform;
issue the digital token on the blockchain-based tokenization platform based on the identifier of the blockchain-based tokenization platform;
present the user interface to the client after the digital token is issued on the blockchain-based tokenization platform based on the identifier of the blockchain-based tokenization platform, wherein the user interface is programmed to receive a user input from the client, wherein the user input includes the identifier for the asset, the version of the asset, and a content;
take an action with respect to the digital token after the user input is received based on identifying the digital token via the identifier for the asset and the version of the asset, wherein the action includes modifying the first set of key-value pairs based on the content or adding the new key-value pair to the first set of key-value pairs based on the content; and
reissue the digital token on the blockchain-based tokenization platform based on the identifier of the blockchain-based tokenization platform after the action is taken with respect to the digital token.

15. The system of claim 14, wherein the hardware server is further programmed to:
present the user interface to the client after the digital token is issued on the blockchain-based tokenization platform based on the identifier of the blockchain-based tokenization platform, wherein the user interface is programmed to receive the identifier for the asset, the version of the asset, and a selection of a file containing a human-readable descriptive text that discloses, references, or represents a particular investment attribute of the asset;

receive the identifier for the asset, the version of the asset, and a copy of the file based on the selection after the digital token is issued on the blockchain-based tokenization platform based on the identifier of the blockchain-based tokenization platform;

encrypt the copy such that an encrypted file is formed and the encrypted file is identified by a cryptographic hash value after the digital token is issued on the blockchain-based tokenization platform based on the identifier of the blockchain-based tokenization platform;

send the encrypted file to be stored on a storage external to the hardware server and the blockchain-based tokenization platform after the digital token is issued on the blockchain-based tokenization platform based on the identifier of the blockchain-based tokenization platform;

identify the digital token via the identifier for the asset and the version of the asset after the digital token is issued on the blockchain-based tokenization platform based on the identifier of the blockchain-based tokenization platform; and cause the cryptographic hash value to be written into a new key-value pair within the second set of key-value pairs without (a) modifying or removing the second subset of the set of asset-specific attributes already recited in the second set of key-value pairs and (b) creating a new digital token such that the encrypted file is linked to the digital token for retrieval from the storage and decryption thereof by the hardware server via the cryptographic hash value after the digital token is issued on the blockchain-based tokenization platform based on the identifier of the blockchain-based tokenization platform.

16. The system of claim 14, wherein the hardware server is further programmed to:

receive an identifier virtually representing an asset-specific attribute of the digital token from a software application hosted outside of a data center containing the hardware server after the digital token is issued on the blockchain-based tokenization platform based on the identifier of the blockchain-based tokenization platform;

encrypt the identifier virtually representing the asset-specific attribute of the digital token such that an attribute value represented as a cryptographic hash is formed; and cause the cryptographic hash to be written into a new key-value pair within the first set of key-value pairs without modifying or removing the first subset of the set of asset-specific attributes already recited in the first set of key-value pairs such that a change in the new key-value pair is recoded on the blockchain-based tokenization platform external to the data center and the software application.

17. The system of claim 14, wherein the digital token is a first digital token, wherein the header component is a first header component, wherein the attribute component is a first attribute component, wherein the immutable component is a first immutable component, and the hardware server is further programmed to:

receive a set of identification data for the first digital token from a software application hosted outside of a data center containing the hardware server after the digital token is issued on the blockchain-based tokenization platform based on the identifier of the blockchain-based tokenization platform;

encrypt the set of identification data such that an attribute value represented as a cryptographic hash is formed; and cause the cryptographic hash to be added to a second digital token containing a second header component, a second attribute component containing a third set of key-value pairs, and a second immutable component such that the cryptographic hash is written into a new key-value pair within the third set of key-value pairs without modifying or removing those asset-specific attributes that are already recited in the third set of key-value pairs and such that a change in the new key-value pair is recoded on the blockchain-based tokenization platform external to the data center and the software application.

18. The system of claim 14, wherein the first subset of the set of asset-specific attributes and the second subset of the set of asset-specific attributes share at least one asset-specific attribute.

19. The system of claim 14, wherein the first subset of the set of asset-specific attributes and the second subset of the set of asset-specific attributes do not share any asset-specific attributes.

20. The system of claim 14, wherein the second subset of the set of asset-specific attributes is a copy of the first subset of the set of asset-specific attributes.

21. The method of claim 1, wherein the server is a single server.

22. The method of claim 1, wherein the server is a set of servers.

23. The system of claim 14, wherein the hardware server is a single server.

24. The system of claim 14, wherein the hardware server is a set of servers.

* * * * *